US006649546B2

(12) United States Patent
Ohata

(10) Patent No.: US 6,649,546 B2
(45) Date of Patent: Nov. 18, 2003

(54) ELASTICALLY STRETCHABLE COMPOSITE SHEET AND PROCESS FOR MAKING THE SAME

(75) Inventor: Hiroyuki Ohata, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 126 days.

(21) Appl. No.: 09/812,299

(22) Filed: Mar. 20, 2001

(65) Prior Publication Data

US 2002/0037678 A1 Mar. 28, 2002

(30) Foreign Application Priority Data

Mar. 30, 2000 (JP) ....................................... 2000-095475

(51) Int. Cl.[7] .................................................. D04H 3/12

(52) U.S. Cl. ........................... 442/328; 97/103; 97/198; 97/381; 156/229; 264/167; 264/288.8

(58) Field of Search .......................... 442/97, 103, 198, 442/328, 381; 264/167, 288.8; 156/229

(56) References Cited

U.S. PATENT DOCUMENTS 4,107,364 A 8/1978 Sisson ........................ 428/196
4,863,779 A 9/1989 Daponte ..................... 428/152
5,683,787 A 11/1997 Boich et al. ................ 428/198
5,939,178 A 8/1999 Boich ......................... 428/198

FOREIGN PATENT DOCUMENTS

| | | | |
|---|---|---|---|
| DE | 195 23 497 | A1 | 1/1997 |
| EP | 0 432 763 | A1 | 6/1991 |
| EP | 1 069 223 | A1 | 1/2001 |
| FR | 2 748 279 | A1 | 11/1997 |
| JP | 8-504693 | | 5/1996 |
| WO | WO 96/38620 | | 12/1996 |

OTHER PUBLICATIONS

Copy of European Search Report dated Aug. 7, 2001.

*Primary Examiner*—Terrel Morris
*Assistant Examiner*—John J. Guarriello
(74) *Attorney, Agent, or Firm*—Butzel Long

(57) ABSTRACT

An elastically stretchable composite sheet that includes an elastic layer and an inelastic layer formed with stretchable fibers having a relatively small diameter and bonded to at least one surface of the elastic layer. In the inelastic layer bonded to the elastic layer is formed with thermoplastic synthetic fiber, at least 80% by weight of stretchable fibers includes thermoplastic synthetic fiber containing lubricant of 0.1~5.0% by weight.

4 Claims, 5 Drawing Sheets

ELASTICALLY STRETCHABLE COMPOSITE SHEET AND PROCESS FOR MAKING THE SAME

BACKGROUND OF THE INVENTION

This invention relates to an elastically stretchable composite sheet comprising a stretchable elastic layer and a stretchable inelastic layer bonded to each other and a process for making the elastically stretchable composite sheet.

PCT Japanese Patent Application Publication No. 1996-504693A describes a multilayered elastic sheet-like structure comprising a rubber-based elastic layer and an inelastic fibrous layer. This sheet-like structure of prior art is obtained by a process comprising steps of placing these rubber-based elastic layer and inelastic fibrous layer upon each other, melting them together or bonded them to each other, stretching them by 100~200% and then relaxing them. The rubber-based elastic layer is formed with a film or the like and the inelastic fibrous layer is formed with a web made from long fibers such as a spun bond or melt blown fiber web.

According to the prior art as disclosed in the Publication, if it is intended to form the inelastic fibrous layer with, for example, long fibers of polypropylene, a stretch ratio of polypropylene in the step of melt spinning should be limited to a value as low as possible in order that these long fibers can be stretched together with the elastic layer by 100~200%. This is because that a high stretch ratio of polypropylene would promote crystallization of polypropylene which would, in turn, make it impossible to stretch this inelastic fibrous layer together with the elastic layer at a desired high stretch ratio in the subsequent step. The stretch ratio thus limited in the step of melt spinning will necessarily make it impossible to use the fibers of a desired small diameter. With a disadvantageous consequence, the resultant fibers will give a wearer of the sanitary article using such fibers a touch less than the article using the fibers of appropriately small diameter. In addition, if it is intended to obtain a multilayered elastic sheet-like structure including a bulky inelastic fibrous layer, the fiber having its diameter as small as possible may be used to improve its bulkiness and furthermore to reduce a material cost. However, such advantage can be not obtained so far as the fiber diameter tends to be large.

SUMMARY OF THE INVENTION

It is an object of this invention to provide an elastically stretchable sheet-like structure comprising an elastic layer and an inelastic fibrous layer formed with fibers each having a relatively small diameter.

According to one aspect of this invention, there is provided an elastically stretchable composite sheet comprising an elastic layer, the elastic layer being elastically stretchable at least in one direction, and an inelastic layer of fibers, the inelastic layer being inelastically stretchable in the one direction and bonded to at least one surface of the elastic layer and, according to another aspect of this invention, there is provided a process for making such an elastically stretchable composite sheet.

The elastically stretchable composite sheet an the process for making the composite sheet further comprise at least 80% by weight of said fibers including thermoplastic synthetic fiber containing lubricant of 0.1~5.0% by weight.

The elastically stretchable composite sheet according to this invention uses the fibers containing the lubricant as the stretchable fibers which can be stretched at a ratio sufficiently higher than in the case of the fiber contains no lubricant to reduce the fiber-diameter and thereby to provide the composite sheet with a desired comfortable touch. The thermoplastic synthetic resin as raw material for the stretchable fiber has a fluidity improved by addition of the lubricant and makes it possible to set the nozzle temperature of the extruders at a relatively low level. This facilitates, in turn, the fiber discharged from the extruders to be cooled. In this way, a cost for operation of the extruders is reduced and a productivity of the stretchable fibers is improved.

DETAILED DESCRIPTION OF THE PREFERRED EMBODIMENTS

Details of an elastic stretchable composite sheet and a process for making the same according to this invention will be more fully understood from the description given hereunder with reference to the accompanying drawings.

Figure 1:
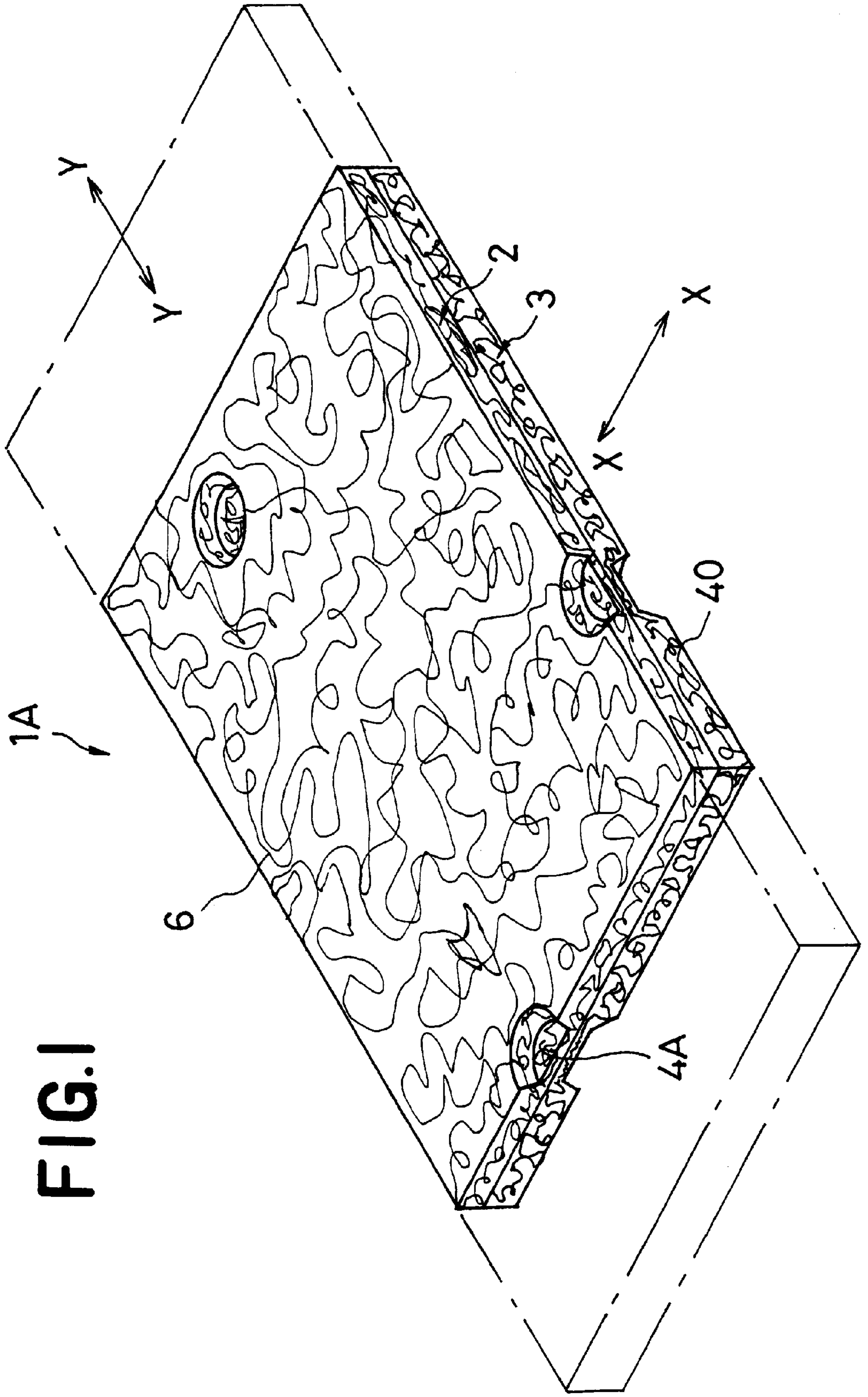
FIG. 1 is a perspective view of a composite sheet (first composite sheet)
Figure 2:
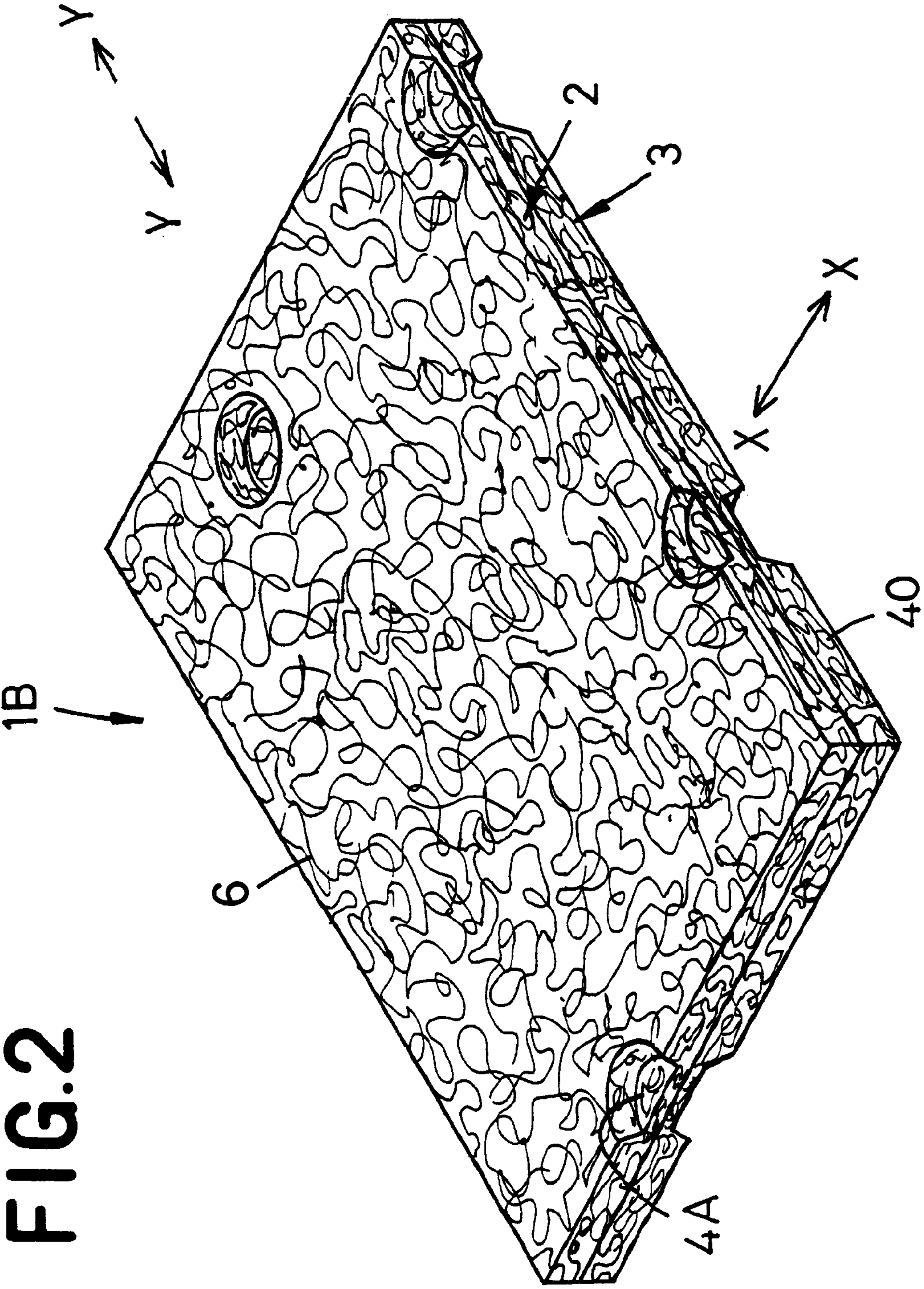
FIG. 2 is a view similar to FIG. 1 depicting a composite sheet (second composite sheet)
Figure 3:
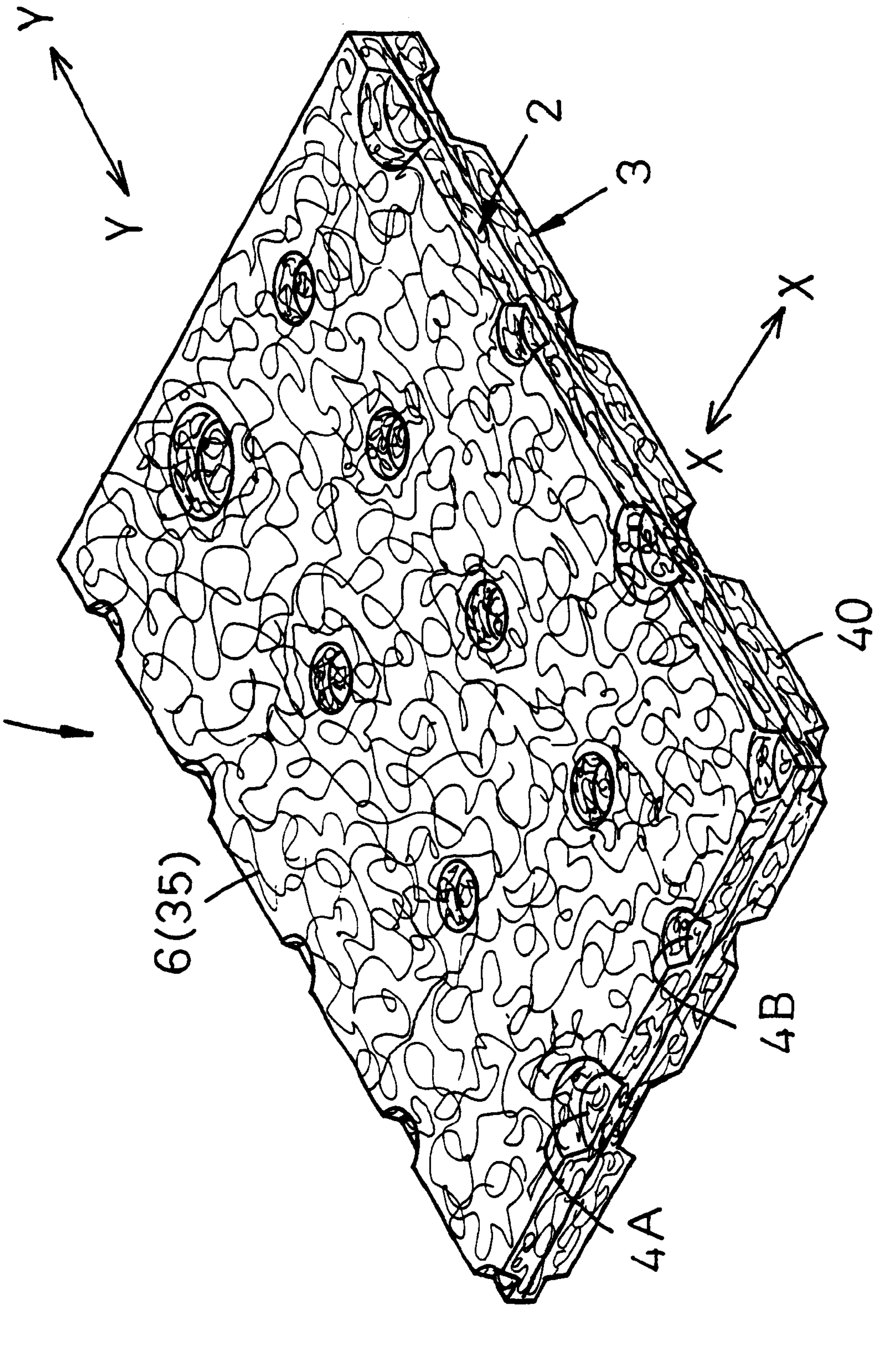
FIG. 3 is a view similar to FIG. 1 depicting a composite sheet (third composite sheet)

FIGS. 1, 2 and 3 are perspective views of a first composite sheet 1A, a second composite sheet 1B and a third composite sheet 1C, respectively, depicting the elastically stretchable composite sheet according to this invention in different states and embodiments. Both the first composite sheet 1A and the second composite sheet 1B respectively have an upper layer 2 and a lower layer 3 integrally bonded with together in first bond regions 4A. The upper layer 2 of the first composite sheet 1A is inelastically stretchable at least in a direction indicated by Y—Y of two directions indicated by X—X and Y—Y and the lower layer 3 is elastically stretchable at least in the Y—Y direction of the two directions indicated by X—X and Y—Y.

The upper layer 2 is an assembly of continuous fibers 6 made of thermoplastic synthetic resin in which the fibers are bonded together preferably only in the first bond regions 4A but not in the remaining region defined between each pair of the adjacent first bond regions 4A, 4A. The continuous fibers 6 extend on the upper surface of the lower layer 3 to describe irregular curves.

Such continuous fibers 6 may be of thermoplastic synthetic resin such as polyproplylene, polyester or polyethylene and 80% by weight of these fibers 6 contains at least one type of lubricant such as fatty acid amide, fatty acid ester or metallic soap. More preferably, 80% by weight of these fibers 6 containing the lubricant are those of polypropylene's homopolymer, ethylene/propylene copolymer, ethylene/propylene/butene or a fibrous mixture containing at least two of these fibers. The continuous fibers 6 preferably contain the lubricant by 0.1~5% by weight thereof and may contain inorganic filler such pigment or dye or barium sulfate at most by 5% by weight thereof. 20% by weight or less of these continuous fibers may comprise thermoplastic synthetic fibers, chemical fibers or natural fibers containing no lubricant.

The respective lower layers 3 of the first and second composite sheets 1A, 1B are sheets being elastically stretchable in the direction Y—Y, preferably in both the direction Y—Y and the direction X—X at least by 100%, preferably by 200% and more preferably at least by 400%. After having been stretched by 100%, these sheets can contract to a length 1.3 times or less with respect to their initial length. Such sheets may be formed by card web of elastic threads, nonwoven fabric of elastic threads in the form of a thermal bond nonwoven fabric or a spun lace nonwoven fabric, a woven fabric of elastic threads, or a film of styrene- or olefine-based thermoplastic elastomer.

The first bond regions 4A should be intermittently arranged in the direction Y—Y and otherwise not specified. However, it is preferred to arrange them intermittently also in the direction X—X and to dimension an area of the individual bond region in a range of 0.1~10 $mm^2$.

These upper layer 2 and a lower layer 3 may be bonded together in the first bond regions 4A either by heating them under pressure or by subjecting them to a ultrasonic treatment. Alternatively, the continuous fibers 6 forming the upper layer 2 may be mechanically intertwined with a structure of the lower layer 3 to bond these two layers 2, 3 together. To achieve such intertwinement, various means such as needle punching and high pressure columnar water stream ejection may be utilized. It is also possible to bond these upper layer 2 and lower layer 3 together in the first bond regions 4A with a suitable adhesive agent.

Of the first and second composites sheets 1A, 1B as have been described above, in the case of the first composite sheet 1A, the upper layer 2 is inelastically stretched at a given ratio and the lower layer 3 is elastically stretched at the given ratio, as the sheet 1A is stretched at the given ratio in the direction Y—Y as indicated by chain lines. Relieved of the tension, the lower layer 3 can elastically contract substantially to its initial dimension. Thereupon, the upper layer 2 having been stretched under a plastic deformation of the continuous fibers 6 is compelled by a contractile force of the lower layer 3 to contract with formation of large loops or a plurality of gathers, although the upper layer 2 itself has no contractile force.

The second composite sheet 1B depicted in FIG. 2 corresponds to the first composite sheet 1A having been stretched once and then left to contract in the manner as has been described above.

The third composite sheet 1C corresponds to the second composite sheet 1B additionally provided with second bond regions 4B. Each of these second bond regions 4B has an area smaller than the area that each of the first bond regions 4A has, but has its number per unit area larger than the number per unit of the first bond regions 4A.

While both the first composite sheet 1A and the second composite sheet 1B are elastically stretchable, there are differences between them. One of the differences lies in that a length of the continuous fibers 6 extending in the direction Y—Y between each pair of the adjacent bond regions 4A, 4A in the first composite sheet 1A is different from the corresponding length in the second composite sheet 1B. Specifically, the continuous fibers 6 in the second composite sheet 1B are longer and finer than those in the first composite sheet 1A by the length and the fineness changed due to plastic deformation thereof. The continuous fibers 6 deformed in this manner form large loops and/or a plurality of gathers between each pair of the adjacent first bond regions 4A, 4A as the first composite sheet 1A once having been stretched contracts to form the second composite sheet 2B. The upper layer 2 of the second composite sheet 1B having such loops and/or gathers is more bulky and flexible than the upper layer 2 in the first composite sheet 1A has, offering a wearer of the sanitary article using such composite sheet a comfortable touch. Another difference between the first and second composite sheets 1A, 1B lies in a force required to stretch these composite sheets 1A, 1B in the direction Y—Y. Specifically, the force required to stretch the first composite sheet 1A at the desired ratio comprises the force required for plastic deformation of the continuous fibers 6 of the upper layer 2 plus the force required for elastic deformation of the lower layer 3. On the other hand, only the force required to stretch the lower layer 3 is sufficient to stretch the second composite sheet 1B at the desired ratio. This is because that the upper layer 2 has its continuous fibers 6 already stretched sufficiently to eliminate a demand for further stretch. The upper layer 2 merely changes its direction as the second composite sheet 1B is stretched and substantially no affection on the force required to stretch the second composite sheet 1B. The continuous fibers 6 describing the loops and/or the gathers are straightened between the respective pairs of the adjacent first bond regions 4A, 4A in which the continuous fibers 6 are bonded to the lower layer 3 as the second composite sheet 1B with the lower layer 3 being elastically deformed. The force required to further stretch the second composite sheet 1B from such state comprises the force required to stretch the lower layer 3 plus the force required to stretch the straightened continuous fibers 6.

Figure 4:
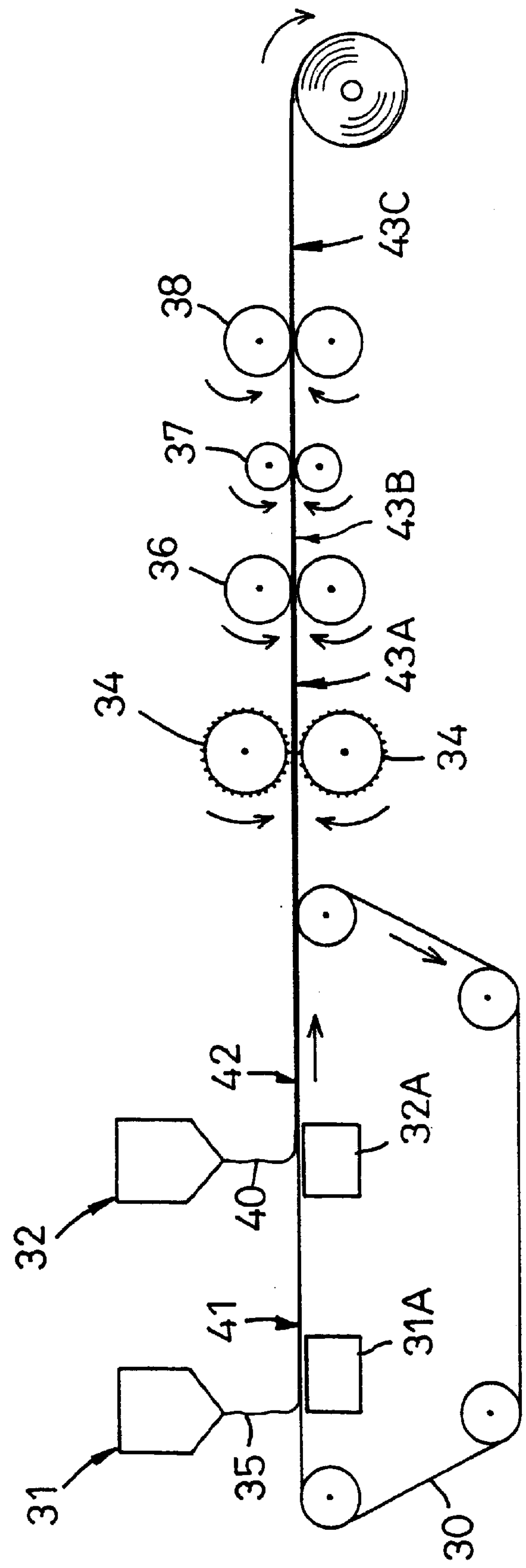
FIG. 4 is a diagram schematically illustrating a process for making the composite sheet.

FIG. 4 is a diagram schematically illustrating an example of the process for making the first~third composite sheets 1A~1C. An endless belt 30 travels from the left to the right as viewed in FIG. 4. In the vicinity of the left end, a first melt blown fiber extruder 31 is provided above the belt 30 and a suction mechanism 31A is provided below the belt 30. The first extruder 31 has a plurality of nozzles arranged transversely of the belt 30 and discharges from these nozzles first melt blown continuous fibers 35 of inelastic thermoplastic synthetic resin. These continuous fibers 35 are stretched or not stretched before they are accumulated on the belt 30 so as to describe irregular curves and to form a first web 41. A discharging condition of the first extruder 31 as well as a travelling condition of the belt 30 are selected so that, in the first web 41, the first continuous fibers 35 accumulated one upon another on the belt 30 may be free from being fused together or, if fused together, these continuous fibers 41 may be easily separated one from another in the subsequent step. These first continuous fibers 35 preferably have a breaking extension of 300% or higher. The first continuous fibers 35 having such level of breaking extension is of thermoplastic synthetic resin such as polypropylene, polyester or polyethylene containing lubricant such as fatty acid amide, fatty acid ester or metallic soap by 0.1~5.0% by weight thereof. The polypropylene preferably takes the form of homopolymer, or ethylene/propylene copolymer or ethylene/propylene/butene copolymer containing the lubricant by 0.1~5.0% by weight thereof.

On the right of the first extruder 31, there are provided a second melt blown fiber extruder 32 and a suction mechanism 32A. The second extruder 32 also has a plurality of nozzles arranged transversely of the belt 30 and discharges from these nozzles second melt blown continuous fibers 40 of elastically stretchable thermoplastic elastomer and these continuous fibers 40 are accumulated on the belt 30 so as to describe irregular curves and to form a second web 42. A discharging condition of the second extruder 32 is selected so that the second continuous fibers 40 accumulated one upon another may be fused together and the second web 42 may form a sheet which is elastically stretchable in the travelling direction of the belt 30, more preferably not only this travelling direction of the belt 30 but also in the direction orthogonal to the travelling direction. The second continuous fibers 40 preferably have a breaking extension higher than that of the first continuous fibers 35.

The first and second webs 41, 42 placed upon each other are fused together under heat and pressure in the first bond regions 4A arranged intermittently in their longitudinal direction corresponding to the travelling direction of these webs 41, 42 and in their transverse direction orthogonal to the longitudinal direction, at least in the longitudinal direction to form a first composite web 43A corresponding to the first composite sheet 1A as these first and second webs 41, 42 pass through a nip defined between a pair of embossing rolls 34, 34. The first bond regions 4A are provided so that each of them has a size, for example, of 0.1~10 $mm^2$ and spaced apart from the longitudinally as well as transversely adjacent first bond regions 4A by 3~30 mm, respectively.

The first composite web 43A then passes through a nip defined between first and second drawing rolls 36, 37. A velocity at which the first roll 36 rotates is lower than a velocity at which the second roll 37 rotates and this differential velocity is selected so that the first composite web 43A may be stretched at a desired ratio, for example, of 50~300% without exceeding a breaking extension of the first web 41 and the maximum elasticity of the second web 42. The second web 42 is elastically stretched between the immediately precedent first bond region 4A and the immediately following first bond region 4*a* as viewed in the travelling direction. At the same time, the first continuous fibers 35 are straightened in the travelling direction between the pair of the first bond regions 4A, 4A and then plastically deformed to form a second composite web 43B.

The second composite web 43B formed in this manner then proceeds to a pair of third rolls 38. A velocity at which these third rolls 38 rotate is the same as that of the first rolls 36 so that the second composite web 43B elastically contracts to the length of the first composite web 43A between the second rolls 37 and the third rolls 38. The third rolls 38 function also as embossing rolls adapted to partially emboss the second composite web 43 having elastically contracted and thereby to form a third composite web 43C having the second bond regions 4B of FIG. 3. The second bond regions 4B are provided so that each of them has a size, for example, of 0.1~5 $mm^2$ and spaced apart from the longitudinally as well as transversely adjacent second bond regions 4A by 0.5~5 mm, respectively, longitudinally as well as transversely of the third composite web 43C. While the second bond regions 4B are preferably spaced apart from the first bond regions 4A, exploitation of the invention will not be affected even if some of the second bond regions 4B are placed upon some of the first bond regions 4A.

Thereafter the first composite web 43A may be cut into an appropriate dimension to obtain the first composite sheet 1A of FIG. 1. The second composite web 43B having contracted in the manner as has been described above may be cut into an appropriate dimension to obtain the second composite sheet 1B of FIG. 2. Similarly, the third composite web 43C may be cut into an appropriate dimension to obtain the third composite sheet 1C of FIG. 3. The composite sheet obtained from the second composite web 43B has only the first bond regions 4A and the composite sheet obtained from the third composite web 43C has the first bond regions 4A and the second bond regions 4B. The first continuous fibers 35 used in the process illustrated by FIG. 4 correspond to the continuous fibers 6 in FIGS. 1~3 and the first web 41 comprising these fibers 6 is destined to form the upper layer 2 of FIGS. 1~3. The second web 42 is destined to form the lower layer 3 of FIGS. 1~3. In this process, the third pair of rolls 38 may be provided in the form of the rolls merely functioning as feed rolls similar to the first pair of rolls 36.

In the second composite web 43B and the third composite web 43C obtained in this manner, the first and second webs 41, 42 may be stretched after they have been bonded together in the first bond regions 4A to loosen fusion or entanglement among the fibers of the first web 41. Uneven distribution of the first continuous fibers 35 in the first web due to such fusion or intertwinement can be thereby eliminated to obtain the second and third composite webs 43B, 43C presenting a uniform touch.

In the process for making the first-third composite sheets 1A~1C according to this invention, the first composite web 43A can be stretched also in its transverse direction orthogonal to the direction in which the first composite web 43A travels. Thereby the portion of the first continuous fibers 35 extending transversely of the first composite web 43A can be stretched. The second bond regions 4B of the third composite web 43C serve to firmly bond the first web 41 now free from unevenness of their distribution to the second composite web 42 so that these two webs 41, 42 will not be separated from each other even if stretch and contraction are repeated.

The first continuous fibers made from thermoplastic synthetic resin, particularly homopolymer of polypropylene or propylene copolymer used in this process may be added with suitable lubricant to alleviate a frictional resistance among the polymer molecules and a crystallization possibly occurring in the course of stretching. Consequently, the first web 41 formed with the first continuous fibers 35 can be stretched together with the second web 42 with a stretchability higher than in the case of the continuous fibers containing no lubricant even when these fibers 35 remain in a relatively large diameter as they have been discharged from the first extruder 31 or these fibers 35 are stretched immediately after discharged to a relatively small diameter.

In the second composite web 43B obtained by stretching the first composite web 43A, the first continuous fibers 35 have their diameter reduced and their length increased as these continuous fibers 35 are stretched. As a result, the first web 41 has its apparent bulkiness increased and its touch softened. In addition, the lubricant added to the thermoplastic synthetic resin increases a fluidity of this resin and allows a nozzle temperature of the first extruder, i.e., a resin temperature to be adjusted at a level lower than in the case of the thermoplastic synthetic resin containing no lubricant. The lower the resin temperature, the easier cooling of the resin, so that the process of FIG. 4 can have a surplus resin cooling capacity and correspondingly increase an amount of the resin discharged from the extruder per unit time. In this way, a productivity of the first continuous fibers 35 per unit time can be increased.

The steps of the process according to this invention illustrated in FIG. 4 can be modified in various manners. For example, it is possible to feed the second web 42 onto the belt 30 before the first web 41. It is also possible to bond the first and second webs 41, 42 together using needle punching or high pressure columnar water stream injecting technique instead of using the embossing rolls 34 or 38. Furthermore, an alternative arrangement is also possible such that there is provided a third extruder at the downstream of the second extruder 32 so that third web similar to the first web may be formed by inelastic third melt blown continuous fibers discharged from this third extruder on the second web and thereby a three-layered composite sheet 1A~1C comprising the first and second webs 41, 42 and the third web may be formed. The first web 41 and the third web may be identical to each other or different from each other in various factors such as type, color and fiber diameter of the resin.

Figure 5:
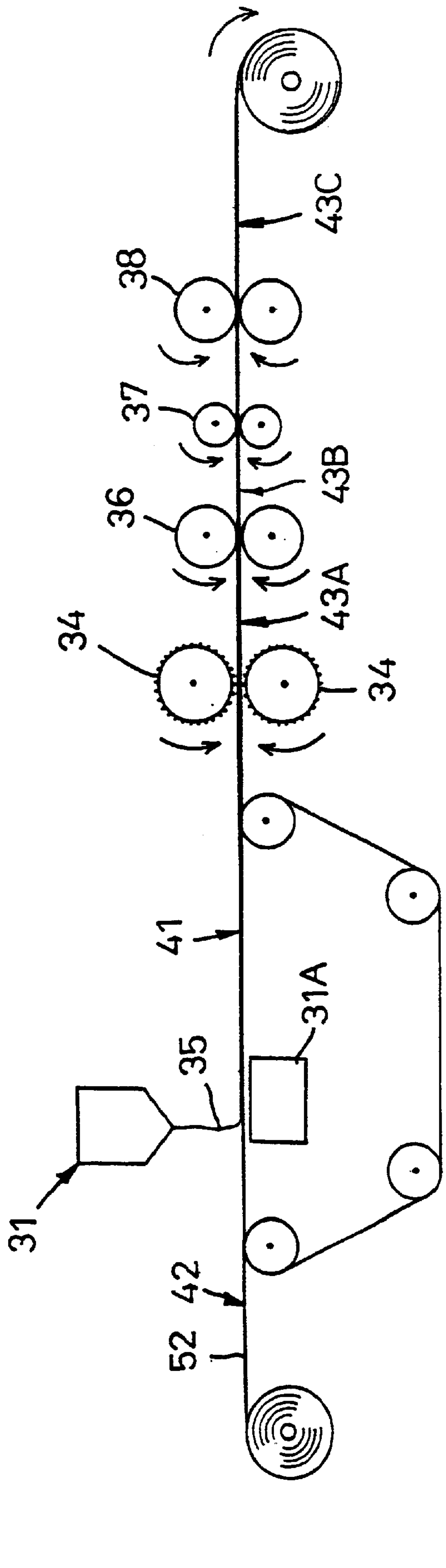
FIG. 5 is a diagram similar to FIG. 4 schematically illustrating a process arranged in different manner from that illustrated in FIG. 4 for making the composite sheet.

FIG. 5 is a diagram similar to FIG. 4 schematically illustrating a process arranged in different manner from that illustrated in FIG. 4. In this alternative embodiment of the process, a film 52 made of thermoplastic elastomer and being elastically stretchable in the running direction of the belt 30 is fed as the second web 42 from the left as viewed in the FIG. 5 and the first web 41 comprising the first continuous fibers 35 is fed onto this film 52. Similarly to the case of FIG. 4, the first and second webs 41, 42 pass through the nip defined between the pair of embossing rolls 34 in which they are intermittently fused together in the first bond regions 4A to form the first composite web 3A which is then stretched by the first and second rolls 36, 37. Thereafter the first composite web 3A is left to contract and, if desired, guided through the nip defined between the third pair of rolls 38 for intermittent fusion in the second bond regions 4B to form the third composite web 43C. By fusing the first web 41 with the second web 42 in the form of the film 52 in this manner to form the first and second bond regions 4A, 4B, it is not apprehended that the first web 41 and the second web 42 might be easily separated from each other even if an area of the individual first and second bond regions 4A, 4B is dimensioned to be as small as in the order of 0.1~1 mm, since the first web 41 comprises the continuous fibers. It should be understood, however, that the area of the first and second bond regions 4A, 4B may be dimensioned to be as large as in the order of 10 $mm^2$.

It is possible without departing from the scope of this invention to make the melt blown continuous fibers using ordinary melt extruders usually used to make a spun bond nonwoven fabric or the like, instead of the first and second extruders 31, 32.

The first composite sheet 1A obtained by this invention is easily stretched and the second and third composite sheets 1B, 1C obtained from this first composite sheet 1A presents a comfortable touch. In view of such characteristics, these composite sheets 1A~1C are suitable as a cloth or an elastic member used for a sanitary article such as a disposable diaper, a sanitary napkin, a disposable pants or a disposable gown used in medical site.

EXAMPLE

A stretchable web having a construction as set forth in Table 1 was placed upon both surfaces of elastically stretchable web having a construction also as set forth in Table 1, then these webs placed upon each other were guided through a nip defined between a pair of heat-embossing rolls. Thereby these webs were fused together in a plurality of bond regions occupying 15% of a total web surface area to obtain an elastically stretchable first composite sheet corresponding to that according to this invention as shown in FIG. 1. The first composite sheet was stretched by 150% in one direction, then left to contract and finally cut into an appropriate dimension to obtain an elastically stretchable second composite sheet corresponding to that according to this invention as shown in FIG. 2. This second composite sheet exhibited properties as set forth in Table 1.

Control

A stretchable web was placed upon both surfaces of the elastically stretchable web used in EXAMPLE and these webs were fused together in the same manner as in EXAMPLE as these webs were guided through the nip defined between the pair of embossing rolls. Thereafter these webs fused together were stretched by 100% in the case of CONTROL 1 and by 150% in the case of CONTROL 2 to obtain composite sheets. These composite sheets obtained in the respective CONTROLs exhibited properties as set forth in Table 1.

| | EXAMPLE | CONTROL 1 | CONTROL 2 |
|---|---|---|---|
| Elastic web | | | |
| Fiber | Melt blown fiber of ethylene-based elastomer (Note 1) | (Same as EXAMPLE) | (Same as EXAMPLE) |
| Basis weight | 30 $g/m^2$ | | |
| Stretch | 700% | | |
| Fiber-diameter | 200 □m | | |
| Stretchable web | | | |
| Fiber | Melt blown fiber of polypropylene homopolymer (Note 2) | Melt blown fiber of polypropylene homopolymer (Note 2) | Melt blown fiber of polypropylene homopolymer (Note 2) |
| Lubricant (Note 3) | 1% | 0% | 0% |
| Basis weight | 15 $g/m^2$ | 15 $g/m^2$ | 15 $g/m^2$ |
| Fiber-diameter | 12 □m | 12 □m | 20 □m |
| Breaking extension | 300% | 150% | 300% |
| Extrusion Temp. | 250 □ | 280 □ | 280 □ |
| 2nd composite sheet | Composite sheet from the above webs | Composite sheet from the above webs | Composite sheet from the above webs |
| Stretch ratio to 1st composite sheet | 150% | 100% | 150% |
| Fiber-diameter | 10 □m | 11 □m | 18 □m |
| Max stretch (Note 4) | 80% | 30% | 80% |

(Note 1) MI=70 g/min as measured according to JIS (Japanese Industrial Standards) K6758

(Note 2) MI=65 g/min as measured according to JIS K6758

(Note 3) calcium stearate (Note 4) The maximum stretchability of the composite sheet on stress-strain curve under a substantially uniform force when the composite sheet is stretched again in the same direction as that in which the composite sheet has previously been stretched.

Referring to Table 1, the fiber of CONTROL 1 made of polypropylene homopolymer fiber and containing no lubricant has a breaking extension lower than a breaking extension presented by the fiber of EXAMPLE made of the same homopolymer but containing no lubricant. The composite sheet of CONTROL 1 using such fiber presents a stretchability lower than that presented by the second composite sheet of EXAMPLE. The fiber of CONTROL 2 made of homopolymer and containing no lubricant may be thickened to a diameter of 20 □m to obtain a breaking extension substantially equal to that presented by the fiber of EXAMPLE. The composite sheet of CONTROL 2 using such thickened fiber can obtain a stretchability substantially equal to that presented by the second composite sheet of EXAMPLE. However, the individual fiber in the composite sheet of CONTROL 2 has a diameter as thick as 18 □m and is unable to offer a desired flexibility.

What is claimed is:

1. An elastically stretchable composite sheet comprising:

an elastic layer that is elastically stretchable in at least one direction; and an inelastic layer that is inelastically stretchable in said one direction and bonded to least one surface of said elastic layer, said inelastic layer comprising at least 80% by weight of thermoplastic synthetic fibers which contain about 0.1 to 5.0% by weight of a lubricant.

2. The composite sheet according to claim 1, wherein said thermoplastic synthetic fibers comprise at least one of polypropylene homopolymers, ethylene/propylene copolymers, and ethylene/propylene/butene copolymers.

3. The composite sheet according to claim 1, wherein said elastic layer and said inelastic layer are fused together in bond regions intermittently arranged in said one direction and a length of said thermoplastic fibers extending between pairs of adjacent bond regions in said one direction is longer than a rectilinear distance between said pairs of adjacent bond regions.

4. The composite sheet according to claim 1, wherein said lubricant comprises at least one of a fatty acid amide, a fatty acid ester and a metallic soap.

* * * * *